United States Patent [19]

Hollinger

[11] Patent Number: 4,899,268

[45] Date of Patent: Feb. 6, 1990

[54] FREQUENCY-DEPENDENT SINGLE-PHASE TO THREE-PHASE AC POWER CONVERSION

[75] Inventor: Theodore G. Hollinger, Redmond, Oreg.

[73] Assignee: APC-Onsite, Inc., Redmond, Oreg.

[21] Appl. No.: 351,080

[22] Filed: May 10, 1989

[51] Int. Cl.[4] .............................................. H02M 5/00
[52] U.S. Cl. ........................................ 363/4; 363/36; 363/148
[58] Field of Search ............... 363/2, 4, 10, 36, 148, 363/149, 154, 132

[56] References Cited

U.S. PATENT DOCUMENTS 4,618,809 10/1986 Maeda ................................. 363/148
4,644,241  2/1987 Maeda ................................. 363/36

FOREIGN PATENT DOCUMENTS 0076167  5/1984  Japan .................................... 363/148

OTHER PUBLICATIONS

Dewan, "A Novel Static Single-to-Three-Phase Converter", IEEE Transactions on Magnetics, vol. MAG-17, No. 6, Nov. 1981, pp. 3287-3289.

Primary Examiner—Peter S. Wong
Attorney, Agent, or Firm—Kolisch, Hartwell & Dickinson

[57] ABSTRACT

Apparatus for supplying from a single-phase, known-frequency AC source, three-phase AC power at the same frequency. The apparatus features circuitry which employs high-speed power switching with respect to only one phase of a three-phase load, with the result that only two high-speed power-switching devices (transistors) are required.

4 Claims, 1 Drawing Sheet (PHASE 1)  $A \rightarrow -\alpha \sin A$
(PHASE 2)  $B \rightarrow +\alpha \sin A$
(PHASE 3)  $C \rightarrow +1.73 \alpha \cos A$

FREQUENCY-DEPENDENT SINGLE-PHASE TO THREE-PHASE AC POWER CONVERSION

BACKGROUND AND SUMMARY OF THE INVENTION

This invention pertains to power conversion apparatus, and specifically to apparatus which enables the conversion of single-phase AC power to three-phase AC power. More particularly, it pertains to such a system wherein the AC frequency required by a selected three-phase load is the same of that as an available single-phase source.

There are many circumstances where it is required, or at least desired, to operate a three-phase load, such as a three-phase motor, in a facility where only, for example, conventional 120-volt single-phase power is available.

Conversion circuitry which has been proposed in the past to accomplish the task of "matching the load to the source" is typically quite complex and expensive, in that it usually employs a large number of relatively expensive power switches (switching transistors) to accomplish the required conversion. In most cases, six such switches are employed.

An important object of the present invention is to provide apparatus which is capable of performing the kind of conversion just mentioned utilizing a minimum number (no more than two) of such switches.

This surprising reduction in the number of power switches required to effect conversion results from the recognition that, in a sense, the two available output terminals of single-phase AC power can, in effect, each be connected directly to a different one of the input terminals in the selected load, with the voltage supply to the third load input terminal being derived from the single-phase source, and supplied through only two power switches operated under computer or microprocessor control. Put another way, the invention rests, in strong measure, on the recognition that, in the setting described, high-speed power switching is not required in the provision of power to two of the three input terminals in a three-phase load.

The advantages of such a recognition are immediately apparent. The resulting circuitry is greatly simplified, and its costs substantially reduced, in comparison with similar characteristics of the conventional single-phase to three-phase conversion systems.

These and other objects and advantages which are attained by the invention will become more fully apparent as the description which now follows is read in conjunction with the accompanying drawings.

DETAILED DESCRIPTION OF THE INVENTION

In Expression I set forth immediately below the voltage conditions required for each of the three input terminals (phases) in a three-phase load are expressed:

Expression I:
Phase 1 = $\alpha$ Sin A
Phase 2 = $\alpha$ Sin (A+120°)
Phase 3 = $\alpha$ Sin (A+240°)

Subtracting Phase 1 from all of the phases in this Expression yields Expression II.

Expression II:
Phase 1 = $\alpha$ Sin A = $\alpha$ Sin A
Phase 2 = $\alpha$ Sin (A+120°) − $\alpha$ Sin A
Phase 3 = $\alpha$ Sin (A+240°) − $\alpha$ Sin A Expanding Expression II gives:

Expression III:
Phase 1 = 0
Phase 2 = $\alpha$(Sin A.Cos 120° − Cos A.sin 120°) − $\alpha$ Sin A
Phase 3 = $\alpha$(Sin A.Cos 240° − Cos A.Sin 240°) − $\alpha$ Sin A An evaluation of this yields:

Expression IV:
Phase 1 = 0
Phase 2 = $\alpha$(−1.5 Sin A − .866 Cos A)
Phase 3 = $\alpha$(−1.5 Sin A + .866 Cos A)

Reduction then leads to:

Expression V:
Phase 1 = 0
Phase 2 = 1.73$\alpha$ Sin (A−30°)
Phase 3 = 1.73$\alpha$ Sin (A+30°)

Shifting all phases by +30° gives:

Expression VI:
Phase 1 = 0
phase 2 = 1.73$\alpha$ Sin A
Phase 3 = 1.73$\alpha$ Sin (A+60°)

Multiplying, then, by 1.156, and subtracting $\alpha$ Sin A from all phases yields:

Expression VII:
Phase 1 = 0 − $\alpha$ Sin A
Phase 2 = 2$\alpha$ Sin A − $\alpha$ Sin A
Phase 3 = 2$\alpha$ Sin (A+60°) − $\alpha$ Sin A An expansion of this leads to:

Expression VIII:
Phase 1 = − $\alpha$ Sin A
Phase 2 = $\alpha$ Sin A
Phase 3 = 2$\alpha$(Sin A.Cos 60° − Cos A.Sin 60°) − $\alpha$ Sin A Evaluating and re-expressing, one gets:

Expression IX:
Phase 1 − = $\alpha$ Sin A
Phase 2 = $\alpha$ Sin A
Phase 3 = 1.73$\alpha$ Cos A With this transformation performed, and the new equivalency seen, one recognizes immediately that high-speed power switching in a conversion system is only required to supply the Phase 3 requirements—the other two phase requirements being derived directly from the un-switched single-phase source.

Figure 1:
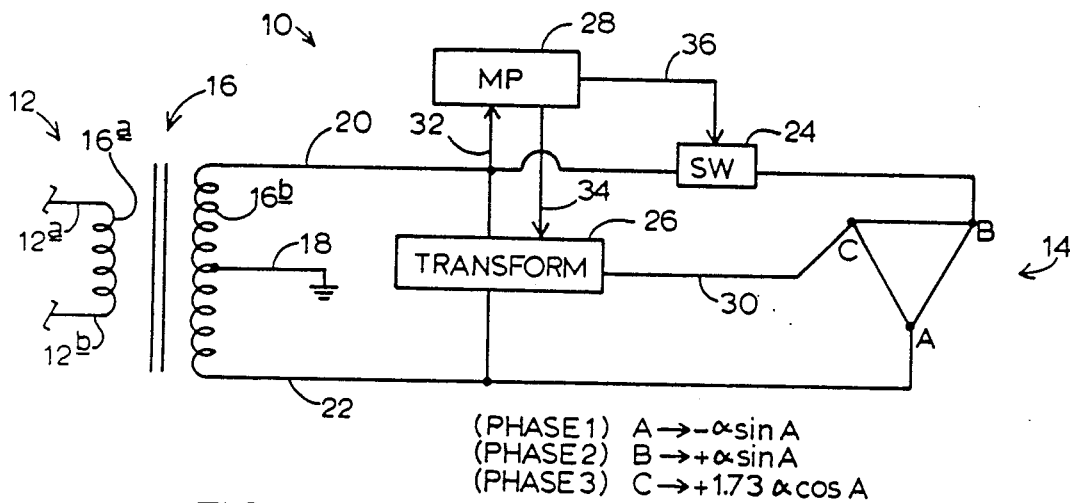
FIG. 1 is a simplified block diagram illustrating the conversion apparatus of the present invention.

Turning attention now to FIG. 1, the system, or apparatus, of the invention is shown generally at 10.

Indicated at 12 is a conventional 120-volt single-phase source characterized by the conventional operating frequency of 60-Hz, and including a pair of output terminals shown at 12a, 12b.

At the right side of FIG. 1, shown generally at 14, is a conventional three-phase motor (load) including three input terminals shown at A, B, C.

The source output terminals are connected to the primary winding 16a of a voltage-doubling step-up transformer 16 whose secondary winding 16b is center-tapped and grounded at 18, with its opposite ends connected to conductors 20, 22. The voltage across primary winding 16a, of course, takes the form of $\alpha$ Sin A, with an amplitude, nominally, of 120-volts. With secondary winding 16b center-tapped and grounded as shown, the voltage on conductor 22 takes the form of −α Sin A (Phase 1), and that on conductor 20 takes the form of α Sin A (Phase 2), each of these voltages having the same nominal amplitude of 120-volts.

Conductor 20 is connected through a non-expensive, slow-action switch 24 to motor input terminal B. More about switch 24 will be mentioned shortly. Conductor 22 is connected directly to motor input terminal A.

Also shown in FIG. 1, in block form, are a transform circuit 26, and a microprocessor, or computer, 28. Speaking in general terms, the transform circuit is connected as shown to conductors 20, 22 which supply operating power, as will be explained. This circuit also is connected by a conductor 30 to motor input terminal C. On conductor 30, the transform circuit supplies, as will be explained shortly, a voltage in the form of 1.73α Cos A (Phase 3). The factor 1.73 is an absolute value multiplier which multiplies the nominal amplitude (120-volts) of the source.

Completing a description of FIG. 1, via a conductor 32 which is connected to conductor 20, microprocessor 28 senses the zero-crossing condition of voltage on the latter. Via a cable 34, the microprocessor operates the two-only, high-speed transistor switches which, as will be explained, form part of circuit 26. Finally, via a conductor 36, the microprocessor functions to open and close switch 24. When system 10 is operated to energize motor 14, on the occurrence of a selected zero-crossing of voltage on conductor 20, the microprocessor closes switch 24 to complete a direct connection between conductor 20 and motor input terminal A. The only requirements of this switch are that it close upon energizing of the motor, opens upon de-energizing, and be capable of carrying the maximum expected load current. With the system in operation, the forms of the voltages applied to the three motor input terminals are indicated at the lower right-hand side of FIG. 1. With source 12 taking the form of a conventional 120-volt single-phase source, the voltages applied to the motor input terminals are ideally matched to operate a conventional 208-volt AC motor.

Figure 2:
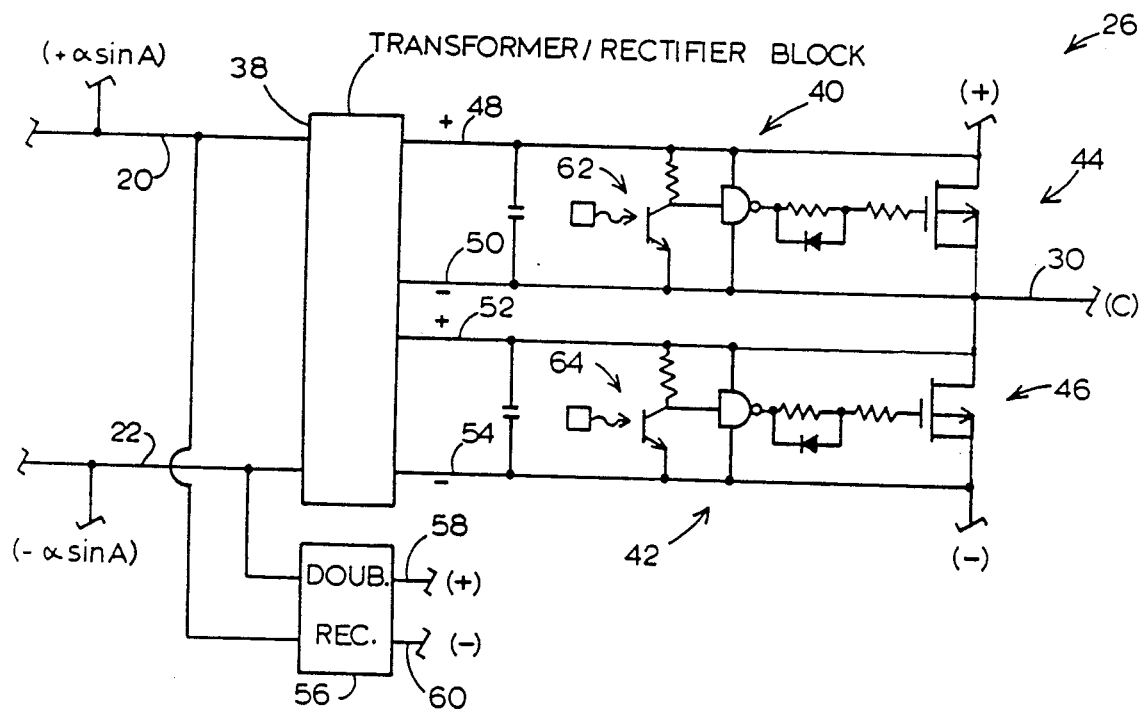
FIG. 2 is a more detailed drawing illustrating the block in FIG. 1 identified by the term "TRANSFORM".

Switching attention now to FIG. 2, here details of transform circuit 26 are illustrated. It should be noted at this point that the transform circuit and the microprocessor together constitute herein what is referred to as electronic means. Microprocessor 28 is also referred to as algorithm-controlled computer means.

Included in circuit 26 are a conventional transformer/rectifier block 38, the input side of which is connected to previously mentioned conductors 20, 22 (see the +α Sin A and the −α Sin A indicators on the left side of FIG. 2), with the output side connected to two conventional driver circuits 40, 42 which drive the two-only power-switching transistors 44, 46, respectively, included in circuit 26.

Within block 38, voltage supplied from conductors 20, 22 is suitably transformed and rectified to provide, on associated pairs of output conductors 48, 50 and 52, 54, suitable DC sources for energizing driver circuits 40, 42, respectively.

Further included in circuit 26 is a conventional voltage doubler and rectifier 56 which connects to previously mentioned conductors 20, 22. DC output from this unit is supplied on conductors 58, 60.

As was mentioned earlier, driver circuits 40, 42, which are duplicates of one another, are entirely conventional in construction, with each including a conventional optical transistors, such transistors being shown at 62, 64. Though not shown in FIG. 2, transistors 62, 64 are coupled to microprocessor 28 via previously mentioned cable 34. Signals supplied respectively to these transistors by the microprocessor cause them to open and close in accordance with the manner in which the microprocessor has been programmed to operate. Such operation derives switches 44, 46 appropriately.

At the right side of FIG. 2, near the top and bottom thereof, are shown upwardly and downwardly extending fragmented conductors with plus and minus signs next to them. The one marked with the plus sign is connected to conductor 58, and the one marked with the minus sign is connected to conductor 60. Thus, applied between these two conductors is a DC voltage with a nominal amplitude of 680-volts.

The point of connection between transistors 42, 44 connects with previously mentioned conductor 30.

Microprocessor 28 is programmed to switch transistors 42, 44 on and off at a rate to establish, on conductor 30, a sinusoidal voltage artifact with a frequency of 60-Hz. With the DC-doubled voltage available across the two transistors collectively, the microprocessor employs conventional pulse-width modulation during switching of each of the transistors to produce, on conductor 30, a voltage having the form of 1.73α Cos A. The algorithm required to produce this kind of activity is entirely conventional and well within the skill and understanding of those skilled in the art. Accordingly, no details of such an alogrithm are expressed herein.

The elegant simplicity of the apparatus proposed by the present invention should thus be very apparent. High-speed switching, employing only two high-speed power-switching transistors is required only for one of the three input terminals of a three-phase load. The other two terminals are simply supplied, in positive and negative directions, directly with the sinusoidal voltage present in source 12.

The proposed invention, therefore, enables one easily, and at relatively low cost, to handle three-phase AC loads with power derived from the usual, readily available single-phase AC source.

The various objects and advantages which are attained by the invention have thus been expressed. Variations and modifications in the specific implementation of the invention shown herein may be made, of course, without departing from the spirit of the invention.

It is claimed and desired to secure as Letters Patent:

1. Apparatus for supplying to a three-phase electrical load including three input terminals, operating power from a single-phase, known-frequency, sinusoidal power source including two output terminals, said apparatus, in operative condition, comprising means operatively connecting each of a first and second of such input terminals with a different one of such output terminals of the direct supply to the latter of voltage from the former, and electronic means operatively connected both to such two output terminals and to the third input terminal for supplying the latter with a sinusoidal voltage artifact matching the frequency of the source and having an amplitude which is a predetermined absolute value greater than that of the source.

2. The apparatus of claim 1, wherein said electronic means includes algorithm-controlled computer means.

3. The apparatus of claim 2, wherein said electronic means further includes no more than two electronic power switches operatively connected to and controlled by said computer means.

4. The apparatus of claims 1, 2 or 3, wherein such absolute value equals substantially 1.73.

* * * * *